United States Patent
Hossain

(10) Patent No.: US 10,294,405 B2
(45) Date of Patent: May 21, 2019

(54) OIL-BASED DRILLING FLUID EMPLOYING JOJOBA OIL

(71) Applicant: King Fahd University of Petroleum and Minerals, Dhahran (SA)

(72) Inventor: Mohammed Enamul Hossain, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 727 days.

(21) Appl. No.: 14/926,551

(22) Filed: Oct. 29, 2015

(65) Prior Publication Data

US 2017/0121585 A1 May 4, 2017

(51) Int. Cl.
*C09K 8/36* (2006.01)

(52) U.S. Cl.
CPC ............ *C09K 8/36* (2013.01); *C09K 2208/34* (2013.01)

(58) Field of Classification Search
CPC ........ C09K 8/06; C09K 8/36; C09K 2208/34; E21B 7/00
See application file for complete search history.

(56) References Cited

U.S. PATENT DOCUMENTS

| 5,318,954 A | 6/1994 | Mueller et al. |
| 5,586,608 A | 12/1996 | Clark et al. |
| 5,658,860 A * | 8/1997 | Clark .................. C09K 8/28 507/134 |
| 2007/0287636 A1 | 12/2007 | Heller et al. |
| 2012/0247763 A1* | 10/2012 | Rakitsky ............. C04B 24/08 166/279 |
| 2015/0344767 A1* | 12/2015 | Lei ..................... C08B 11/20 507/224 |

FOREIGN PATENT DOCUMENTS

EP        0 308 651 B1     7/1992

OTHER PUBLICATIONS

Jojoba Naturals, www.jojobanaturals.com, Sep. 29, 2015, retrieved from https://archive.org at https://web.archive.org/web/20150929065531/https://www.jojoanaturals.com/learn/jojoba-chemistry/.*

* cited by examiner

*Primary Examiner* — Frances Tischler
(74) *Attorney, Agent, or Firm* — Oblon, McClelland, Maier & Neustadt, L.L.P.

(57) ABSTRACT

An oil-based drilling fluid with jojoba oil as a main component. Jojoba oil is non-toxic and biodegradable. This environmentally-friendly oil-based drilling fluid also comprises water, a viscosifier, an emulsifier, and an absence of diesel and/or mineral oil.

17 Claims, No Drawings

OIL-BASED DRILLING FLUID EMPLOYING JOJOBA OIL

BACKGROUND OF THE INVENTION

Technical Field

The disclosure relates to an oil-based drilling fluid comprising jojoba oil, which is substantially free from diesel, mineral, and crude oil.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

When drilling an oil well, a drilling fluid has to be used to transport the debris generated by drilling to the surface. The drilling fluid must also cool and lubricate the tool, maintain the wall of the borehole, exert a sufficient counter-pressure, and prevent damage to the formation (Hossain, M. E., Al-Majed, A. A., Fundamentals of Sustainable Drilling Engineering, ISBN 978-0-470-87817-0, John Wiley & Sons, Inc. Hoboken, N.J., and Scrivener Publishing LLC, Salem, Mass., USA, pp. 786, 2015—incorporated herein by reference in its entirety). Two types of drilling fluids are mainly used: water-based and oil-based fluids. Water-based fluids are more economical and ecologically acceptable than oil-based fluids. However, the latter have clear operational advantages, in particular when drilling under high pressure and high temperature conditions such as those in extremely deep wells. High pressure and high temperature wells often have pressures exceeding 69 MPa and temperatures higher than 150° C. The oil-based fluid is inert to the components of the geological formation, especially clay, thereby minimizing damage to the drill zone, and the fluid reduces friction better than water-based fluids.

Research in this field has gradually shifted from traditional oil-based fluids that are rich in diesel oil to oil-based fluids that usually contain plant oils and are therefore less noxious to the environment. However, the plant oils are not as thermally stable as diesel oil. In temperatures beyond 150° C., the environmentally-friendly plant oil-based fluids degrade, and can damage the reservoirs and reduce productivity in wells.

Safety and environmental factors are considered when choosing an oil for the drilling fluid. Products that have been used in the past may no longer be acceptable. As more environmental laws are enacted and new safety rules applied, the choice of the oil must also be re-evaluated. To meet the challenges of a changing environment, product knowledge and product testing become essential tools for selecting suitable oils for drilling fluid systems. Beginning in the 1990s, environmentally friendly drilling fluid systems have been developed that have low toxicity, easy degradation and little effect on environment. However, these fluid systems fail to be widely applied due to high costs or unsatisfactory application effects. There are also some newly developed drilling fluid systems which have complex synthetic process, failing to achieve industrialized manufacture. It is therefore necessary to develop a new environmentally friendly drilling fluid system which is easily synthesized, economical, and can protect the environment and oil reservoirs while satisfying the needs of drilling engineering. Several research groups have explored and reported low toxicity drilling fluids.

Bailey et al. (1986) examined viscosities of drilling fluids formulated with low toxicity mineral oil and diesel oil under different temperatures and pressures (T. Bailey, P. Bern, F. McEwan, 1986, Low Toxicity Oil Muds: A Knowledge of Downhole Rheological Behavior Assists Successful Field Application, SPE Drilling Engineering, 107-114—incorporated herein by reference in its entirety).

Yassin et al. (1991) carried out tests on palm oil derivatives as the oil in oil-based drilling fluids and the toxicity effect on plant and aquatic life (A. Yassin, A. Khamis, O. A. Mohamed, 1991, Formulation of an Environmentally Safe Oil Based Drilling Fluid, SPE Asia-Pacific Conference—incorporated herein by reference in its entirety). The oils used in this case were methyl esters of crude palm oil and methyl esters of fatty acids in distilled palm oil. Physiochemical properties of these oils, such as flash point, pour point, aniline point, were characterized at various temperatures and pressures.

Sanchez et al. (1999) formulated drilling fluids from mineral oil, which has less than 0.1% aromatics, and palm oil, which does not have aromatics (G. Sanchez, N. Leon, M. Esclapes, I. Galindo, A. Martinez, J. Bruzual, I. Siegert, 1999, Environmentally Safe Oil Based Fluids for Drilling Activities, SPE/EPA Exploration and Production Environmental Conference—incorporated herein by reference in its entirety). The toxicity and biodegradability of mineral oil and palm oil-based drilling fluids were compared to those of a diesel oil-based drilling fluid. The results indicated that both drilling fluids containing mineral oil and palm oil are non-toxic while the diesel oil-based drilling fluid showed high levels of toxicity.

Dosunmu et al. (2010) developed an oil-based drilling fluid with palm oil and ground nut oil (A. Dosunmu, J. O. Ogunrinde, 2010, Development of Environmentally Friendly Oil Based Drilling fluid Using Palm Oil and Groundnut Oil, Nigeria Annual International Conference and Exhibition—incorporated herein by reference in its entirety). The fluid not only met the environmental standards, but also improved crop growth when discharged into farm lands.

Amanullah et al. (2010) proposed waste vegetable oil as an alternative to mineral oil and diesel oil in high performance drilling fluids for high pressure high temperature wells (M. Amanullah, H. H. Mohammed, 2010, The Recycling of Waste Vegetable Oil for Biodegradable and Environment Friendly OBM Formulation, The $2^{nd}$ Saudi Meeting on Oil and Natural Gas Exploration and Production Technologies, KFUPM Campus, Dhahran, Saudi Arabia—incorporated herein by reference in its entirety). Large volumes of waste vegetable oil are generated annually worldwide. The drilling fluid with waste vegetable oil is not only eco-friendly, but also economical.

Apaleke et al. (2012) formulated a drilling fluid with canola oil as the base oil for an oil-based fluid, which is environmentally friendly, sustainable, and has zero level of toxicity (A. S. Apaleke, A. A. Al-Majed, M. E. Hossain, 2012, State of the Art and Future Trend of Drilling Fluid: An Experimental Study, SPE Latin America and Caribbean Petroleum Engineering Conference—incorporated herein by reference in its entirety). The developed canola oil system was found to be stable at room temperature and simulated downhole conditions. Moreover, the canola oil-based fluid system was formulated without a wetting agent which helped in reduction of the cost of formulation.

Fadiro et al. (2012) evaluated the environmental impact of three different oil-based fluids with base oils, diesel, jatropha oil, and canola oil (A. Fadairo, O. Falode, C. Ako, A.

Adeyemi, A. Ameloko, 2012, Novel Formulation of Environmentally Friendly Oil Based Drilling fluid, New Technologies in the Oil and Gas Industry, 49-80—incorporated herein by reference in its entirety). The results obtained from laboratory tests indicated that jatropha oil has a low degree of toxicity and may be an environmentally viable replacement for the conventional and toxic diesel based fluid.

In view of the foregoing, the objective of the present invention is to provide an oil-based drilling fluid that contains jojoba oil, and which is substantially free from diesel, mineral, and crude oil.

BRIEF SUMMARY OF THE INVENTION

According to a first aspect, the present disclosure relates to an oil-based drilling fluid, comprising: (i) an oil phase, wherein the oil phase comprises jojoba oil, which comprises at least one ester with 38 to 44 carbon atoms, (ii) an aqueous phase, which comprises water, and a water-to-oil phase volume ratio that ranges from 35:65 to 5:95, (iii) a viscosifier, which increases a viscosity of the oil-based drilling fluid, and (iv) an emulsifier, which promotes the dispersion of the aqueous phase in the oil phase.

In most embodiments, the oil-based drilling fluid further comprises a densifier, which increases a density of the oil-based drilling fluid.

In at least one embodiment, the oil phase comprises 80-100 wt % of jojoba oil relative to the total weight of the oil phase.

In most embodiments, the at least one ester is aliphatic and saturated.

In some embodiments, the at least one ester is unsaturated and has at least one carbon-carbon double bond.

In at least one embodiment, the at least one ester has a cis-configuration at the at least one carbon-carbon double bond.

In most embodiments, the at least one ester is a monocarboxylic ester.

In some embodiments, the at least one ester is synthetic, naturally occurring, or a mixture thereof.

In at least one embodiment, the oil phase is non-edible.

In one embodiment, the jojoba oil comprises partially hydrogenated jojoba oil.

In one embodiment, the jojoba oil comprises hydrolyzed or partially hydrolyzed jojoba oil.

In one embodiment, the jojoba oil comprises isomerized or partially isomerized jojoba oil.

In most embodiments, the oil-based drilling fluid comprises 50-80 vol % of the oil phase relative to the total volume of the oil-based drilling fluid.

In some embodiments, the viscosifier is bentonite, guar gum, xanthan gum, carboxylmethyl cellulose, or a combination thereof.

In most embodiments, the emulsifier is a fatty acid, a derivative of fatty acid, a resin acid, a derivative of resin acid, an amine, an amide, a sulfonic acid, a sulfonic alcohol, or a combination thereof.

In some embodiments, the oil-based drilling fluid is substantially free of triglycerides.

In most embodiments, the oil-based drilling fluid is substantially free of diesel oil and mineral oil.

In some embodiments, the oil-based drilling fluid can withstand temperatures of at least 150° C. and pressures of at least 69 MPa.

In at least one embodiment, the densifier is barite, calcium carbonate, hematite, or a combination thereof.

According to a second aspect, the present disclosure relates to an oil well drilling process, comprising: (i) drilling into a geological formation with a drill bit to form a well bore, and (ii) injecting the oil-based drilling fluid of the first aspect into the well bore to lubricate and cool the drill bit during drilling.

The foregoing paragraphs have been provided by way of general introduction, and are not intended to limit the scope of the following claims. The described embodiments, together with further advantages, will be best understood by reference to the following detailed description taken in conjunction with the accompanying drawings.

DETAILED DESCRIPTION OF THE EMBODIMENTS

Embodiments of the present disclosure will now be described more fully hereinafter, in which some, but not all embodiments of the disclosure are shown.

The present disclosure relates to an oil-based drilling fluid that comprises jojoba oil and/or its derivatives. Jojoba oil is a liquid extracted from the seed of the jojoba shrub (*Simmondsia chinensis*), which may be naturally occurring or genetically modified. There are four grades of jojoba oil: (1) a pure, natural, golden-yellow color oil produced by the basic production process, (2) a refined and bleached jojoba oil, with the color removed by bleaching and filtration, (3) a decolorized/deodorized grade, which is used in cosmetics requiring colorless and odorless oils, and (4) a molecular distilled grade, an expensive formulation produced in minimal quantities, with its use having mostly been replaced with decolorized/deodorized jojoba oil. All grades of jojoba oil may be used in the present disclosure. The oil phase may also comprise a mixture of at least two grades of jojoba oil. In a preferred embodiment, the oil phase comprises the pure, golden-yellow color jojoba oil.

The chemical composition of jojoba oil is different from that of other vegetable oils because jojoba oil contains traces of free fatty acids and does not contain triglycerides. Jojoba oil has a high percentage (97 wt %) of monocarboxylic esters formed from mostly monounsaturated fatty acids (e.g. oleic acid (C18:1), eicosenoic acid (C20:1), and docosenoic acid (C22:1)) and monounsaturated fatty alcohols (e.g. docosenol (C22:1) and eicosenol (C20:1)). As esters exhibit low levels of toxicity inherently, and are biodegradable aerobically and anaerobically, they impart the same qualities to jojoba oil (A. A. Hinda, T. Carlson, R. Peresich, 1991, Industry Searching for Alternative to Transport of Drill Cuttings: Biodegradable Esters Substitute for Oil in Drilling Performance, Offshore—incorporated herein by reference in its entirety). Table 1 lists the concentration of each ester found in jojoba oil (M. H. El-Mallah, S. M. El-Shami, 2009, Investigation of Liquid Wax Components of Egyptian Jojoba Seeds, Journal of Oleo Science, 543-548—incorporated herein by reference in its entirety).

TABLE 1

| Percentage by weight of esters in jojoba oil, relative to the total weight of esters | |
| --- | --- |
| No. of carbons | wt % |
| 34 | Trace |
| 36 | ~1 |
| 38 | ~7 |
| 40 | ~30 |
| 42 | ~50 |

TABLE 1-continued

Percentage by weight of esters in jojoba oil, relative to the total weight of esters

| No. of carbons | wt % |
|---|---|
| 44 | ~10 |
| 46 | ~1 |
| 48 | Trace | a higher pour point than diesel oil. As used herein, the term "pour point" refers to the lowest temperature at which a substance will flow under given conditions.

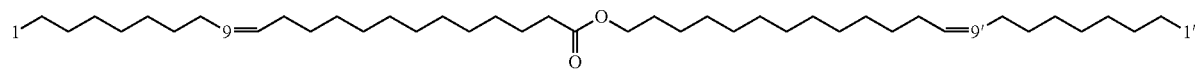

C44 ester

Spencer et al. reported that more than 97 vol % of the fatty acids and fatty alcohols have the carbon-carbon double bond at the ω 9 position (i.e. the ninth carbon from the methyl group) (G. F. Spencer, R. D. Plattner, T. Miwa, 1977, Jojoba Oil Analysis by High Pressure Liquid Chromatography and Gas Chromatography/Mass Spectrometry, Journal of the American Oil Chemists' Society, 187-189—incorporated herein by reference in its entirety). In the practice of the present disclosure, the oil phase may comprise positional isomers of the jojoba esters up to 90 vol % of the total volume of the oil phase, preferably up to 70 vol %, more preferably up to 50 vol %. As used herein, the term "positional isomers" refers to compounds that have the same carbon skeleton and the same functional groups (e.g. carbon-carbon double bond) but differ from each other in the location of the functional groups on or in the carbon chain. For example, ω 9-eicosenoic acid and ω 4-eicosenoic acid are positional isomers. The positional isomers can be either naturally occurring, synthetic, or a mixture thereof.

Jojoba oil contains traces of saturated esters, steroids, hydrocarbons, and tocopherols (alpha-, gamma-, and delta-tocopherols), which are antioxidants. As the unsaturated carbon-carbon double bonds have a tendency to oxidize in use or upon heating, leading to polymerization or other undesirable effects, these antioxidants keep the oil from becoming rancid. For instance, jojoba oil can be heated to 300° C. without showing degradation in general composition and carbon chain length (National Research Council, 1985, Jojoba: New Crop for Arid Lands, New Material for Industry. National Academy Press—incorporated herein by reference in its entirety). Therefore, jojoba oil keeps well and has an exceptional shelf life compared to other plant oils.

The stability of jojoba oil makes it attractive to the various industries. In the pharmaceutical industry, jojoba oil is used as an antifoam agent in the production of antibiotics. Jojoba oil is also used to treat skin disorders. Pure jojoba oil is used in transformers and used as a lubricant in machines operating at high temperatures and/or high speed.

Jojoba oil has higher flash and fire points than diesel oil (Table 2). The lower fire and flash points of diesel may pose a safety hazard. As used herein, the term "flash point" refers to the lowest temperature at which a liquid can form an ignitable mixture in air near the surface of the liquid. The lower the flash point, the easier it is to ignite the material. As used herein, the term "fire point" refers to a temperature at which the vapor produced by that given fuel will continue to burn for at least 5 seconds after ignition by an open flame. The melting point of jojoba oil is about 8-10° C., hence it has

TABLE 2

Properties of a diesel oil, jojoba oil, and the requirements for choosing an oil for the oil-based drilling fluid

| | Required | Diesel oil | Jojoba oil |
|---|---|---|---|
| Flash point (° C.) | >66 | 66 | 286 |
| Fire point (° C.) | >80 | 108 | 344 |
| Pour point (° C.) | <ambient | −18 | 9 |

As jojoba oil has many qualities that are desired in an oil for a drilling fluid, the jojoba oil-based drilling fluid may have the potential to replace toxic diesel oil-based drilling fluids, paving the way to a more environmentally friendly and sustainable drilling system. In a preferred embodiment, the jojoba oil-based drilling fluid is used in high pressure high temperature wells where pressure ranges from 69-271 MPa, preferably 69-241 MPa, more preferably 69-138 MPa, and a bottom hole temperature ranging from 150-300° C., preferably 150-260° C., more preferably 150-205° C. As used herein, the term "bottom hole temperature" refers to the temperature in the borehole at the depth of the bottom of the well. In one embodiment, the jojoba oil-based drilling fluid is used to drill wells in a deepwater reservoir, an alternative shale-sand reservoir, and/or a shale resource reservoir The oil-based drilling fluid may also be used in wells with temperatures and pressures lower than 150° C. and 69 MPa, respectively, such as those wells found in sandstone reservoirs.

According to the first aspect, the present disclosure relates to an oil-based drilling fluid comprising an oil phase. The oil phase is non-edible and comprises 80-100 vol % of jojoba oil relative to the total weight of the oil phase, preferably 85-100 vol %, more preferably 90-100 vol %. In a preferred embodiment, the oil phase comprises 100 vol % jojoba oil, thus excluding crude oil, petroleum-derived oil, such as diesel oil and gas oil, and/or synthetic mineral oil. As used herein, the term "petroleum-derived oil" is composed of about 75% saturated hydrocarbons (e.g. primarily alkanes including straight-chained, branched, and cycloalkanes) and 25% aromatic hydrocarbons (e.g naphthalenes and alkyl-benzenes) by volume. In another embodiment, the oil phase consists essentially of jojoba oil and at least partially excludes petrodiesel components. The oil phase may also exclude other plant oils, and hence is substantially free of triglycerides. In most embodiments, the oil-based drilling fluid comprises 50-90 vol % of the oil phase relative to the total volume of the oil-based drilling fluid, preferably 55-80 vol %, more preferably 60-80 vol %.

Jojoba oil contains at least one fatty acid ester, which is aliphatic and may be a monocarboxylic acid ester, with at least one unsaturated carbon-carbon bond. This bond makes the oil susceptible to many different types of chemical manipulations (e.g. hydrogenation, isomerization, hydrolysis, hydration, and halogenation etc.). In some embodiments, the oil phase comprises at least one ester that is synthetic, naturally occurring, or a mixture thereof. For example, the oil phase may comprise fatty acid esters synthesized by chemically reacting the aforementioned fatty acids with the aforementioned fatty alcohols, and the amount of the fatty acid ester relative to one another matches with that in naturally occurring jojoba oil. In an alternative embodiment, the synthetic jojoba oil has a fatty ester content that is different from naturally occurring jojoba oil. For example, the synthetic jojoba oil may contain a higher concentration of higher boiling esters to provide better heat stability.

Synthetic derivatives of the fatty acid esters in jojoba oil may also be utilized. Non-limiting examples of synthetic derivatives of the esters include, oxidized fatty acid esters, sulfated hydroxylated/oxidized fatty acid esters, sulfonated fatty acid esters, hydroxylated fatty acid esters, halogenated fatty acid esters, alkoxylated fatty acid esters, phosphatized hydroxylated/oxidized fatty acid esters fatty acid esters, and mixtures thereof. More examples of the fatty acid ester derivatives include, but are not limited to, hydrogenated, isomerized, and/or hydrolyzed jojoba oil. An iodine number, which is the amount of iodine, in grams, taken up by 100 grams of the oil or fat, represents the degree of unsaturation in the oil or fat. Saturated oils and fats do not take up iodine, therefore their iodine number is zero, while unsaturated oils and fats consume iodine, and a higher iodine number reflects a higher degree of unsaturation. For example, pure jojoba has an iodine number of 82-84 (A. F. Zaher, O. S. El-Kinawy, D. E. El-Haron, 2004, Solvent Extraction of Jojoba Oil from Pre-pressed Jojoba Meal, Grasas y Aceites, 129-134—incorporated herein by reference in its entirety). The partially hydrogenated jojoba oil utilized in the current disclosure may have an iodine number within the range of 60-84, preferably 70-84, most preferably 75-84, so that the partially hydrogenated jojoba oil has a pour point lower than the ambient temperature. Fully hydrogenated jojoba oil may also be used in the oil-based drilling fluid. However, fully hydrogenated jojoba oil is a solid at ambient temperature (melting point: 68-70° C.), and may therefore require mixing with another liquid oil to provide an oil phase with advantageous drilling fluid properties.

In at least one embodiment, the at least one ester has a cis-configuration at the at least one carbon-carbon double bond. In pure jojoba oil, all the carbon-carbon double bonds have a cis-configuration. The jojoba oil may be isomerized to form a mixture of cis and trans fatty acid ester isomers. The partially hydrogenated jojoba oil may also comprise trans fatty acid esters. The ratio between the cis and trans isomers can be calculated by comparing the peak integrals of the vinylene protons of the isomers from the $^1$H NMR spectra (U. M. Dawoud, A. Disli, Y. Yildirir, B. Z. Uysal, 2002, Structural Elucidation of Jojoba Plant (*Simmondsia Chinensis*) Oil from Saudi Arabia, Journal of Faculty of Pharmacy of Ankara, 223-229—incorporated herein by reference in its entirety). As jojoba oil containing predominantly trans isomers has a higher melting point than pure jojoba oil, the amount of trans isomers should be kept low, preferably less than 25 vol % of the total volume of the oil, more preferably less than 15 vol %, most preferably less than 10% so that the pour point of the jojoba oil is less than the ambient temperature.

The oil phase may also comprise fully hydrolyzed jojoba oil. During a hydrolysis process, the fatty acid esters in jojoba oil are broken down to yield monounsaturated fatty acids and monounsaturated fatty alcohols (i.e. "hydrolysis products"). Hydrolyzed jojoba esters are a highly viscous, tacky gel at room temperature with no defined melting point. In another embodiment, the oil phase comprises partially hydrolyzed jojoba oil. The amount of monounsaturated fatty acids and monounsaturated fatty alcohols relative to the total volume of the oil phase can be quantified by techniques such as gas chromatography and the like. In one embodiment, the oil phase comprises 10-50 vol % of the hydrolysis products, preferably 15-25 vol %, more preferably 15-20 vol %. In some embodiments, derivatives of the monounsaturated fatty acids are used. Such derivatives include, but are not limited to, alkali, alkaline earth, or transition metal salts, alkyl esters, amides, oxidized fatty acids, sulfated hydroxylated/oxidized fatty acids, sulfonated fatty acids, hydroxylated fatty acids, halogenated fatty acids, alkoxylated fatty acids, and phosphatized hydroxylated/oxidized fatty acids. In some embodiments, derivatives of the monounsaturated fatty alcohols are used. Such derivatives include, but are not limited to, alkyl esters, amides, oxidized fatty alcohols, sulfated hydroxylated/oxidized fatty alcohols, sulfonated fatty alcohols, hydroxylated fatty alcohols, halogenated fatty alcohols, alkoxylated fatty alcohols, and phosphatized hydroxylated/oxidized fatty alcohols.

In one embodiment, the oil phase comprises degraded jojoba oil, which contains saturated and/or unsaturated aldehydes and/or ketones, peroxides, and/or hydroperoxides. The amount of degraded jojoba oil relative to the total volume of the oil phase ranges from 1-10 vol %, preferably 1-5 vol %, more preferably 1-3 vol %. In another embodiment, the oil phase contains only degraded jojoba oil.

In an alternative embodiment, jojoba oil is blended with other plant oils, including, but are not limited to, canola oil, rapeseed oil, soybean oil, corn oil, sunflower oil, palm oil, coconut oil, and peanut oil. The aforementioned oils may be naturally occurring or transgenic (genetically modified, such as to produce a higher amount of a specific fatty acid and/or ester). Jojoba oil may also be blended with at least one type of biodiesel. As used herein, the term "biodiesel" refers to a fuel consisting of mono-alkyl esters chemically prepared from reacting the fatty acids in vegetable oils or animal fats with an alcohol, preferably a short chain alcohol such as methanol, ethanol, and propanol, and the oxygen content of biodiesel ranges from 4-12 wt %, preferably 8-12 wt %, more preferably 10-12 wt % relative to the total weight of the biodiesel. The biodiesel can be manufactured from oils, fats and greases that are obtained from virgin vegetable and seed oils, such as soy, mustard, canola, rapeseed, mamouna, palm, babassu, pine, coffee, cottonseed, sunflower, jojoba, tung, castor, olive, peanut, cashew nut, pumpkin seed, corn, rice, perilla, sesame, coconut, safflower, linseed, hemp, Chinese tallow tree, tall oil, and similar types of oils; animal fats, such as poultry offal, tallow, lard, butter, neatsfoot and fish oils; and used cooking oils and trap grease from restaurants. In a preferred embodiment, the oil-based drilling fluid is substantially free of biodiesel. In another embodiment, the oil-based drilling fluid consists essentially of jojoba oil and/or the aforementioned derivatives, and the inclusion of biodiesel is permitted but not required.

The oil-based drilling fluid comprises an aqueous phase that includes water. A water-to-oil phase volume ratio ranges from 35:65 to 0:100, preferably 20:80 to 5:95, more preferably 15:85 to 5:95. The amount of water present in the composition by volume of the oil-based drilling fluid ranges from 0-30 vol %, preferably 4-22 vol %, more preferably 4-13 vol %. Non-limiting examples of water include, fresh water, seawater, brine, or formate brine, which contains potassium formate and/or cesium formate. The amount of salt in brine is more than 50 g/L. The amount of salt in seawater ranges from 30-40 g/L. The amount of salt in saline water ranges from 30-50 g/L. The amount of formate salt in the formate brine ranges from 500-700 g/L.

In the practice of the present disclosure, the oil-based drilling fluid may optionally contain additives, which include, but are not limited to, densifiers, emulsifiers, viscosifiers, corrosion inhibitors, dispersants, flocculants, biocides, salts, and reducers of fluid loss. The methods to prepare and characterize the drilling fluid are known to those skilled in the art.

A viscosifier increases a viscosity of the oil-based drilling fluid, thereby improving the ability of the fluid to transport and suspend solids in the drilling fluid. Examples of a viscosifier include, but are not limited to, guar gum, xanthan gum, carboxylmethyl cellulose, poly anionic cellulose, and montmorillonite clay (e.g. bentonite), or a combination thereof In a preferred embodiment, the viscosifier is bentonite. The oil-based drilling fluid has a plastic viscosity, for example, of at least 10 cP, preferably at least 20 cP, most preferably at least 30 cP. As used herein, the term "plastic viscosity" refers to the resistance of the fluid to flow. A low plastic viscosity indicates that the fluid is capable of drilling rapidly because of the low viscosity of fluid exiting at the bit. A yield point of the oil-based drilling fluid is, for example, of at least 110 lbs/100 ft$^2$, preferably 140 lbs/100 ft$^2$, most preferably at least 160 lbs/100 ft$^2$. As used herein, the term "yield point" refers to the force applied to the fluid to make it begin to flow or yield when the shear rate is zero. The yield point is used to evaluate the ability of a fluid to lift cuttings out of the borehole. A high yield point implies that a fluid has a stronger ability to carry cuttings. The amount of viscosifier added relative to the total weight of the drilling fluid is 1-5 wt %, preferably 1-3 wt %, most preferably 1-2 wt % to obtain the abovementioned desired viscosity and/or yield point.

An emulsifier promotes the dispersion of the aqueous phase in the oil phase. Many oil-based fluids use a system of two emulsifiers to ensure a stable emulsion because the drilling fluid is contaminated by soil cuttings and formation fluids. Primary emulsifiers include, but are not limited to, fatty acids and their derivatives, and resin acids and their derivatives. Secondary emulsifiers improve the stability of the emulsion at high temperatures. Examples of secondary emulsifiers include, but are not limited to, amines, amides, sulfonic acids, sulfonic alcohols. In a preferred embodiment, a combination of a fatty acid and an amine is used. The fatty acids and fatty alcohols in hydrolyzed jojoba oil may also be utilized as emulsifiers. The emulsifiers can be added in the range of about 0.5 to 7 vol % relative to the total volume of the oil-based drilling fluid, depending upon the concentration of water in the oil-based drilling fluid. At a water content of 5 vol % relative to the total volume of the oil-based drilling fluid, there is about 0.5-2 vol % of emulsifiers, preferably 0.5-1.5 vol %, more preferably 0.5-1 vol %. At a water content of 25 vol %, there is about 4-7 vol %, preferably 5-6.5 vol %, more preferably 5-6 vol % of emulsifiers present in the oil-based drilling fluid.

In most embodiments, the oil-based drilling fluid further comprises a densifier. The densifier increases the density of the oil-based drilling fluid in order to equilibrate the wellbore pressure and the formation pressure, especially when drilling through zones that are heavily pressurized. In at least one embodiment, the densifier is barite, calcium carbonate, hematite, or a combination thereof. In a preferred embodiment, the densifier is barite. The densifier can be added up to 42 vol %, preferably up to 30 vol %, more preferably up to 20 vol % in order to obtain a drilling fluid density of at least 0.96 g/cm$^3$, preferably at least 0.98 g/cm$^3$, more preferably at least 1.0 g/cm$^3$.

In one embodiment, the drilling fluid has an alkaline pH to minimize the corrosion of the metallic components in the drilling equipment. In some embodiments, the oil-based drilling fluid further comprises alkaline chemicals to basify the drilling fluid and to convert some additives into oil-soluble forms. Examples include alkaline earth oxides, alkaline earth hydroxides (e.g. calcium hydroxide) and alkali hydroxides such as sodium hydroxide and potassium hydroxide. The oil-based drilling fluid comprises 0.05-5 vol % of the alkaline chemicals, preferably 0.2-1.5 vol %, more preferably 0.4-0.7 vol % relative to the total volume of the drilling fluid. The pH affects the viscosity of the preferred viscosifier, bentonite. A preferred pH range is 7-9.5, more preferably 7.5-9.5, most preferably 8.5-9.5 when the viscosity of bentonite is least affected. Beyond pH 9.5, the viscosity of bentonite and hence the oil-based drilling fluid increases and may result in viscosities that are out of proportion for good drilling properties. In an alternative embodiment, an acidic oil-based drilling fluid is used, and it has a pH ranging from 5.5-7, preferably 6-7, more preferably 6.5-7.

In most embodiments, the oil-based drilling fluid further comprises salts added to the aqueous phase to form brines, which control the properties of formation clays. Non-limiting examples of salts include inorganic salts such as calcium chloride, sodium chloride, and potassium chloride. The amount of the salt relative to the total volume of the drilling fluid is 1-20 vol %, preferably 2-10 vol %, more preferably 2-5 vol %.

In at least one embodiment, the oil-based drilling fluid further comprises a dispersant to break up soil and sediments into smaller particles that can be easily carried by the drilling fluid from one place to another, without causing any unnecessary obstructions. Examples of the dispersant include, but are not limited to, iron lignosulfonates, sulfonated polystyrene maleic anhydride copolymers, and polyacrylic acids having molecular weights less than 8,000. The drilling fluid comprises 0.05-10 vol % of the dispersant, preferably 0.05-2 vol %, more preferably 0.05-1 vol % relative to the total volume of the drilling fluid.

In some embodiments, the oil-based drilling fluid further comprises antioxidants to reduce or eliminate the degradation of the jojoba oil and its derivatives present in the oil phase. The antioxidants are selected from the groups consisting of p-phenylenediamines, secondary arlyamines, alkylarylamines, ketone amine, dihydroquinolines, alkylated phenols, phosphite esters, and alkylated phenol sulfides, which are chemically compatible with the selected oils. The preferred antioxidants employed are 2, 6, di-tert-butyl-p-cresol, butylated-hydroxy-anisole (BHA), butylated-hydroxy-toluene (BHT), tert-butyl-hydroquinone (TBHQ). The range of the antioxidant employed with the prescribed oil varies from about 0.015 to 3.8 wt % relative to the total weight composition of the oil-based drilling fluid, preferably 0.5-3 wt %, more preferably 0.8-2 wt %.

In some embodiments, the oil-based drilling fluid further comprises a corrosion inhibitor. The corrosion of metal is increased if it comes into contact with an acidic formation fluid. Examples of a corrosion inhibitor include, but are not limited to, aluminum bisulfate, iron oxides, zinc chromate, and zinc carbonate. The oil-based drilling fluid comprises 0.05-3 vol % of the corrosion inhibitor, preferably 0.05-2 vol %, more preferably 0.05-1 vol % relative to the total volume of the oil-based drilling fluid.

In one embodiment, the oil-based drilling fluid further comprises flocculants to help in the cluster formation of suspended particles, so that they can be grouped together and removed from the resultant fluid when they reach the surface. Non-limiting examples of flocculants include polyacrylamide polymers, tetrasodium pyrophosphate, sodium chloride, sodium bicarbonate, sodium carbonate, calcium sulfate, calcium hydroxide, and potassium chloride. The oil-based drilling fluid comprises 0.05-10 vol % of the flocculants, preferably 0.05-2 vol %, more preferably 0.05-1 vol % relative to the total volume of the oil-based drilling fluid.

In most embodiments, the oil-based drilling fluid further comprises a biocide to reduce the sourness and thwart the growth of bacteria in the drilling fluid to preserve the chemical integrity of the drilling fluid. Non-limiting examples of the biocide include cholorophenols, formaldehydes, and organic amines. The drilling fluid comprises 100-600 ppm (parts per million) of biocide by weight, preferably 200-500 ppm, more preferably 300-500 ppm.

In most embodiments, the oil-based drilling fluid further comprises filtrate control additives to minimize losses to the formation. Non-limiting examples of filtrate control additives include pregelantinized starch, sodium carboxymethyl cellulose, polyanionic cellulosic polymer, sodium polyacrylate, and chemically modified lignites. The oil-based drilling fluid comprises 0.05-10 vol % of the filtration control additives, preferably 0.5-5 vol %, more preferably 0.5-2 vol % relative to the total volume of the oil-based drilling fluid.

As used herein, the term "gel strength" is defined as the shear stress, which is force per unit area required to sustain a constant rate of fluid movement, measured at a low shear rate after the fluid has set quiescently for a period of time (usually 10 seconds or 10 minutes in the standard American Petroleum Institute procedure). A 10-second gel strength of the oil-based drilling fluid is, for example, of at least 25 lbs/100 ft$^2$, more preferably 40 lbs/100 ft$^2$, most preferably 60 lbs/100 ft$^2$. A 10-minute gel strength of the oil-based drilling fluid is, for example, at least 30 lbs/100 ft$^2$, preferably 50 lbs/100 ft$^2$, more preferably 70 lbs/100 ft$^2$.

In most embodiments, the oil-based drilling fluid can withstand the conditions of a high pressure high temperature well (i.e. temperatures and pressures of 150° C. and 69 MPa). As used herein, the term "withstand" refers to the oil-based drilling fluid retaining the aforementioned rheological properties even when the fluid is utilized under high pressure and high temperature and/or aged in a heated pressurized cell statically or dynamically (i.e. hot-rolling).

According to the second aspect, the present disclosure relates to an oil well drilling process. Once a site of interest is identified, a drill truck drills a starter hole, which is shallower and wider than the future main hole. Then the oil rig drills the main hole with a drill bit to form a well bore. In a preferred embodiment, the oil rig drills to a depth of at least 7,620 meters to access high pressure high temperature oil reservoirs. Throughout the drilling process, the oil-based drilling fluid is pumped down a hollow drill pipe to the drill bit to lubricate and cool the drill bit before exiting the hollow drill pipe to return the surface. The flow rate of the oil-based drilling fluid ranges from 12-26 L/s, preferably 15-22 L/s, more preferably 17-20 L/s. The oil-based drilling fluid has oil, water, at least one emulsifier, and at least one viscosifier. In a preferred embodiment, the oil-based drilling fluid further comprises the abovementioned additives, such as densifiers, emulsifiers, viscosifiers, corrosion inhibitors, dispersants, flocculants, biocides, salts, and reducers of fluid loss, in proportions to suit the conditions of the formation.

For economic and environmental reasons, oil-based fluids are usually cleaned and recirculated. Larger drill cuttings are removed by passing the returned fluid through one or more vibrating screens, and sometimes fine cuttings are removed by passing the fluid through centrifuges. Cleaned fluid may be blended with new fluid for reuse down the borehole.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An oil-based drilling fluid, comprising:
an oil phase comprising 100 wt % of jojoba oil relative to the total weight of the oil phase, wherein the jojoba oil comprises at least one ester with 38 to 44 carbon atoms;
an aqueous phase comprising water, wherein a water-to-oil phase volume ratio ranges from 35:65 to 5:95;
a viscosifier, which increases a viscosity of the oil-based drilling fluid; and
an emulsifier, which promotes the dispersion of the aqueous phase in the oil phase.

2. The oil-based drilling fluid of claim 1, further comprising a densifier, which increases a density of the oil-based drilling fluid.

3. The oil-based drilling fluid of claim 1, wherein the at least one ester is aliphatic and saturated.

4. The oil-based drilling fluid of claim 1, wherein the at least one ester is unsaturated and has at least one carbon-carbon double bond.

5. The oil-based drilling fluid of claim 3, wherein the at least one ester has a cis-configuration at the at least one carbon-carbon double bond.

6. The oil-based drilling fluid of claim 1, wherein the at least one ester is a monocarboxylic ester.

7. The oil-based drilling fluid of claim 1, wherein the at least one ester is synthetic, naturally occurring, or a mixture thereof.

8. The oil-based drilling fluid of claim 1, wherein the oil phase is non-edible.

9. The oil-based drilling fluid of claim 1, wherein the jojoba oil is partially hydrogenated jojoba oil.

10. The oil-based drilling fluid of claim 1, wherein the jojoba oil is isomerized or partially isomerized jojoba oil.

11. The oil-based drilling fluid of claim 1, wherein a water-to-oil phase volume ratio ranges from 20:80 to 15:85.

12. The oil-based drilling fluid of claim 1, wherein the viscosifier is bentonite, guar gum, xanthan gum, carboxylmethyl cellulose, or a combination thereof.

13. The oil-based drilling fluid of claim 1, wherein the emulsifier is a fatty acid, a derivative of fatty acid, a resin acid, a derivative of resin acid, an amine, an amide, a sulfonic acid, a sulfonic alcohol, or a combination thereof.

14. The oil-based drilling fluid of claim 1, which is substantially free of triglycerides.

15. The oil-based drilling fluid of claim 1, which can withstand temperatures of at least 150° C. and pressures of at least 69 MPa.

16. The oil-based drilling fluid of claim 2, wherein the densifier is barite, calcium carbonate, hematite, or a combination thereof.

17. An oil well drilling process, comprising:
   drilling into a geological formation with a drill bit to form a well bore; and
   injecting the oil-based drilling fluid of claim 1 into the well bore to lubricate and cool the drill bit during drilling.

* * * * *